United States Patent [19]
Neward

[11] Patent Number: 5,431,204
[45] Date of Patent: Jul. 11, 1995

[54] FILLER CAP

[76] Inventor: Theodore C. Neward, P.O. Box 725, Cucamonga, Calif. 91730

[21] Appl. No.: 186,791

[22] Filed: Jan. 25, 1994

[51] Int. Cl.$^6$ ............................ B65B 1/04; B65B 3/04
[52] U.S. Cl. ................... 141/319; 141/366; 141/375; 141/309; 222/575
[58] Field of Search ............... 220/861, 891, 729; 222/568, 575; 141/340–342, 319–322, 363, 365, 366, 375, 285, 309

[56] References Cited

U.S. PATENT DOCUMENTS

| | | | |
|---|---|---|---|
| 264,841 | 9/1882 | Poland | 222/568 |
| 1,983,101 | 12/1934 | Schibner | 222/568 X |
| 2,509,098 | 5/1950 | Howard | 141/340 X |
| 2,556,627 | 6/1951 | Miksis | 222/568 |
| 2,714,977 | 8/1955 | Davis | 222/568 X |
| 3,993,094 | 11/1976 | Spooner | 220/86.1 X |
| 4,928,861 | 5/1990 | Schiemann | 222/568 X |
| 5,033,520 | 7/1991 | Kuehmichel | 220/86.1 X |
| 5,085,257 | 2/1992 | Smith | 141/86 |
| 5,129,561 | 7/1992 | Drobish | 222/575 X |
| 5,287,898 | 2/1994 | Falb et al. | 141/309 X |

Primary Examiner—Henry J. Recla
Assistant Examiner—Steven O. Douglas
Attorney, Agent, or Firm—Lyon & Lyon

[57] ABSTRACT

A filler cap, for filling a reservoir with a fluid and automatically controlling the level to which the fluid is filled, has a generally cylindrical base, a cap top attached to the base, a generally cylindrical base extension extending from the cap top, a face plate attached to the base extension, and a nozzle extending from the face plate. To facilitate control of the level to which a fluid is filled, the face plate includes one or more holes therethrough and the nozzle is longitudinally cut at an angle.

12 Claims, 2 Drawing Sheets

FILLER CAP

FIELD OF THE INVENTION

This invention relates to filling devices, and more particularly to a filler cap that facilitates control of the level to which a fluid is filled.

BACKGROUND OF THE INVENTION

There are many different situations in which instruments, devices, machinery, etc., need to be filled with a particular fluid to a specific level for proper maintenance and operation. Due to the vast number of possible situations in which it would be necessary to fill a fluid to a particular level, the filling of brake fluid in an automotive vehicle's master cylinder will be focussed on for exemplary purposes only.

The master cylinder has a reservoir which provides brake fluid to the automotive vehicle's brakes. The master cylinder reservoir generally has minimum and maximum level markers visible on the outside of the reservoir. The brake fluid level normally must be maintained between these level markers for proper operation of the automotive vehicle's brake system. The reservoir, however, is normally located under the hood of the automotive vehicle within the engine compartment. Such a location for the reservoir facilitates a variety of problems for the mechanic or vehicle operator when they attempt to fill the reservoir with brake fluid.

For instance, the engine compartment is usually cramped making it difficult to read the level markers on the reservoir or to view the fluid level within the reservoir. Additionally, the reading of the level markers on the reservoir or the viewing of the fluid level within the reservoir is made increasingly difficult by the fact that the engine compartment is generally a dirty environment which causes the reservoir to be covered with a film of dust, grease, oil, etc. Furthermore, the conventional method of filling the reservoir with brake fluid, by freely pouring the fluid from a brake fluid container, may easily result in spills or overfilling to the point of overflowing the reservoir. Therefore, it would be desirable to have a device that is capable of directing the flow of brake fluid from the container of brake fluid into the master cylinder reservoir, while at the same time controlling the level to which the fluid is filled.

SUMMARY OF THE INVENTION

The filler cap of the present invention serves to fill a reservoir with a fluid and automatically control the level to which the fluid is filled. It preferably has a generally cylindrical base with a cap top extending from one end of the base. A generally cylindrical base extension, attached to the cap top, extends longitudinally and co-axially away from the cap top and attaches to a face plate. Axially attached to the face plate is a nozzle. In a preferred construction, these components are formed out of single piece molded plastic.

Preferably, the face plate includes a plurality of through holes and the nozzle is longitudinally cut at an angle. This configuration facilitates control of the level to which a fluid is filled.

An object of this invention is to provide an improved filler cap.

Further objects and advantages of the present invention will become apparent from a consideration of the drawings and ensuing description.

DESCRIPTION OF THE PREFERRED EMBODIMENT

Referring now in detail to the drawings, therein illustrated is a novel filler cap. Due to the diversity and vastness of possible applications for the filler cap of the present invention, an embodiment will be described for exemplary purposes only. This embodiment will focus on a filler cap application in which a filler cap constructed according to the present invention is used to fill the master cylinder reservoir of an automotive vehicle with brake fluid to the required level.

Figure 1:
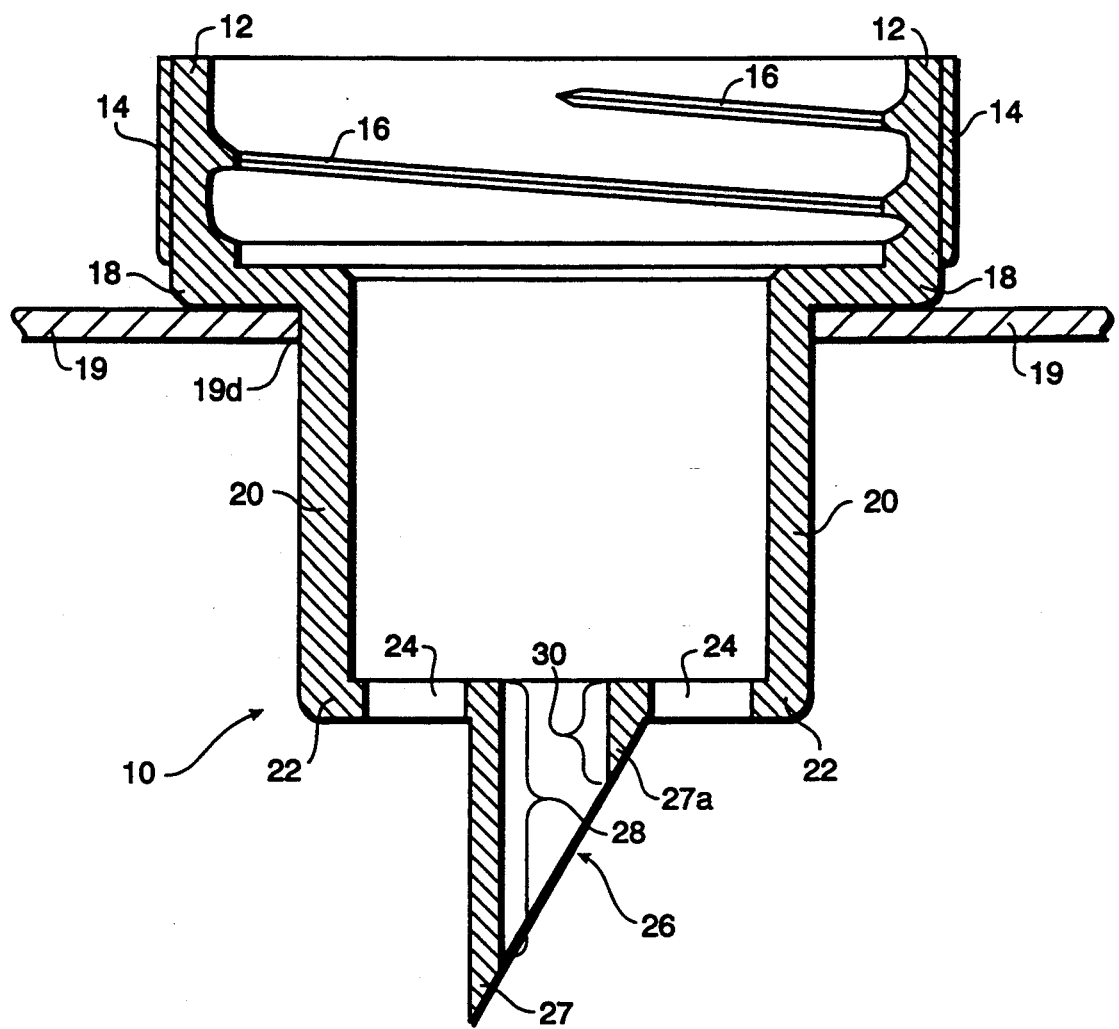
FIG. 1 is a cross-sectional view of a filler cap taken along a line 1—1 in FIG. 2.
Figure 2:
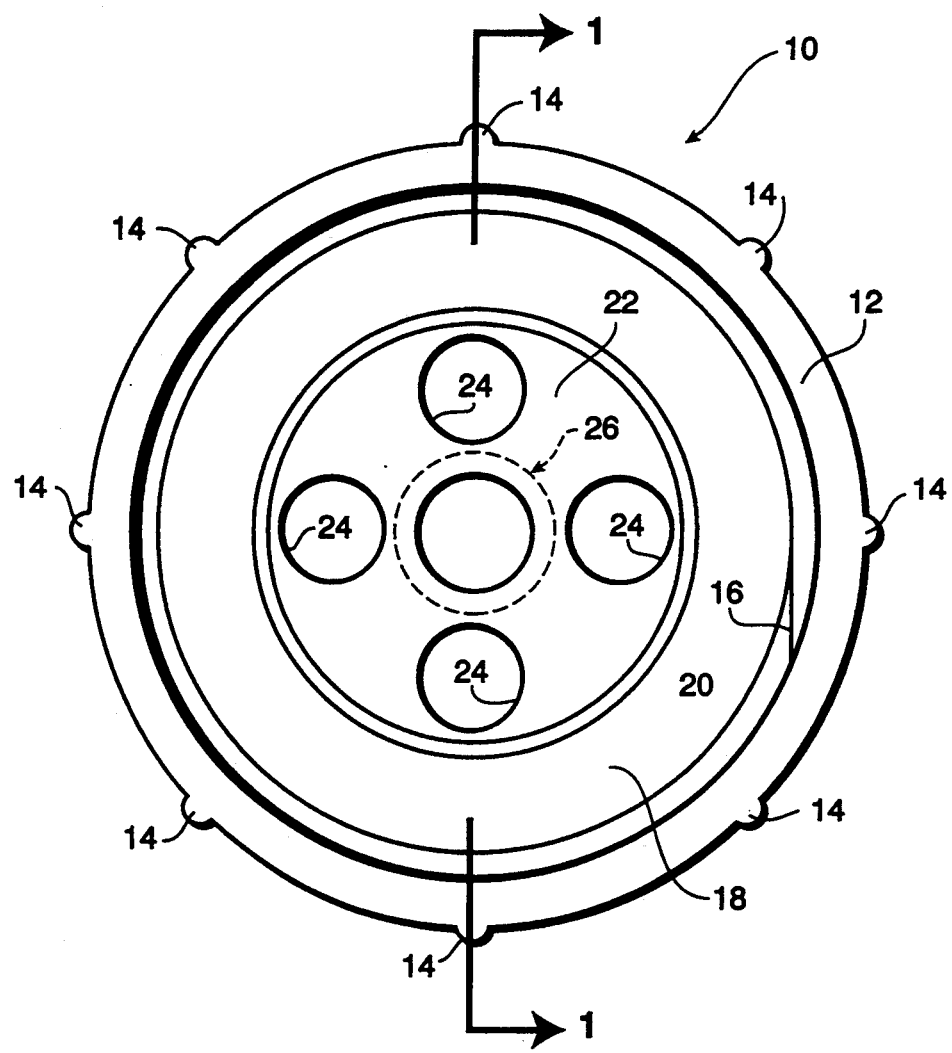
FIG. 2 is an end view of a filler cap.
Figure 3:
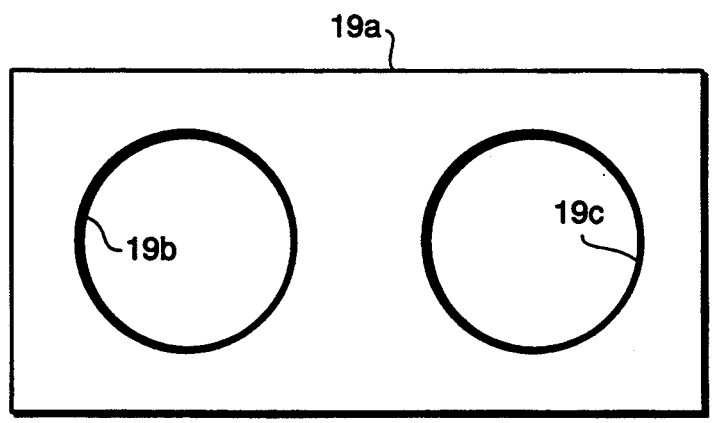
FIG. 3 is a plan view of a plate for use with the filler cap.

Referring to FIGS. 1 and 2, the filler cap 10 is shown to comprise a substantially cylindrical base 12 essentially in the shape of the usual cap for a container. The base 12 includes internal threads 16 and is sized to be attached to the sprout of standard containers of brake fluid (not shown). In addition, the base 12 includes external ribs 14 distributed substantially equidistantly and extending longitudinally about the circumference of the base 12 to facilitate gripping and turning the base 12 when securing it to a container.

Attached to the base 12 is a circularly shaped cap top 18. The cap top 18 extends inwardly at a 90° angle from the base 12 and attaches to a base extension 20 at a 90° angle. The base extension 20 is substantially cylindrical and extends co-axially and longitudinally away from cap top 18 for a suitable predetermined distance to terminate in a face plate 22 at a 90° angle. The predetermined distance between the cap top 18 and the face plate 22 is preferably the distance from the opening of the reservoir top to the maximum level marker on the reservoir.

The face plate 22 is substantially circular and co-axial with the base extension 20. Angularly located at 90° increments about the center of the face plate 22 and at a predetermined radial distance from the center of the face plate 22 are four through holes 24. A substantially cylindrically shaped nozzle 26 extends co-axially and longitudinally away from the face plate 22. The nozzle 26 is cut at an angle 27 along part or all of the length of the nozzle 26, such that the nozzle 26 appears, as in the cross-sectional view of FIG. 1, to have a long wall 28 and a short wall 30. The use of the angle cut 27 is particularly important in enabling the filler cap to cause proper filling of a reservoir as will be described below. It is believed, preferably, that the length of the nozzle 26 should be such that, with the angle cut 27, the upper end 27A of the angle cut 27 terminates close to the outer or lower surface of the face plate 22. In a preferred construction all the components of the filler cap are injection molded as a single unit.

In operation, the base 12 of the filler cap 10 is screwed onto the top of a container of brake fluid with the internal threads 16 of the base 12 mating with threads of the sprout on the top of the brake fluid container. The external ribs 14 on the base 12 are utilized to improve the user's grip to assist in tightening of the connection between the base 12 and the brake fluid container.

After the base 12 is secured to the brake fluid container, the brake fluid container and filler cap 10 assembly are inverted to begin filling the master cylinder reservoir of an automotive vehicle. The filler cap 10 is oriented such that the nozzle 26, the face plate 22, and the base extension 20 are inserted into the reservoir opening substantially vertically as seen in FIG. 1, while the cap top 18 rests on the top edge of the opening of the reservoir. In this orientation, the fluid fills the cavity defined by the length of the base extension 20 and face plate 22, and begins to flow out of the holes 24 and nozzle 26 of the filler cap 10. The angularly cut nozzle 26 disrupts the static fluid condition by allowing the fluid to flow first through the nozzle 26 and, as the reservoir is becoming filled, down the length of the nozzle long wall 28, while air, from the reservoir being filled, enters the nozzle 26 along the nozzle short wall 30. The flow through the nozzle 26 continues until the fluid level in the reservoir reaches approximately the face plate 22 wherein a state of equilibrium occurs. Basically, once the fluid level reaches the upper end 27A of the angle cut 27 of the nozzle 26, and thus approximately the lower surface of plate 22, the state of equilibrium occurs, or stated differently a state of balance between the fluid in the reservoir and the fluid in the brake fluid container occurs. It was found that in using a nozzle 26 with a straight (90°) end, with no angle cut 27, the fluid would sometimes fill the reservoir up to that straight end, and essentially reach a balance condition and not fill the reservoir further. However, it has also been found that when using a nozzle 26 with a straight (90°) end the fluid would sometimes fill the reservoir past the straight end, thus making that configuration unreliable. With the angle cut 27, the filling occurs approximately up to the upper edge 27A of the angle cut 27. This level should be at the maximum level marker of the reservoir. Thus, the filling of brake fluid to a desired level in the master cylinder of an automotive vehicle is accomplished without needing to view the level of the fluid, or level markers, and without the risk of spilling or overfilling.

An alternative arrangement of the filler cap 10 can include a platform 19, which can be round, square, rectangular, or the like. The platform 19 is attached to the filler cap 10 around the base extension 20 as a slight friction fit, and extends radially outwardly from the base extension 20 and cap top 18. The platform 19 is sized and shaped to add maximum support and stability to the filler cap 10 by the platform 19 resting on the edge of the opening reservoir. The platform 19 is particularly useful when the reservoir opening is larger than the diameter of the cap top 18. The operation of this embodiment is identical to that described in regard to the first embodiment.

Furthermore, the platform 19 can have a rectangular shape 19A with a pair of holes 19B, 19C (rather than a single hole 19D on the platform 19 in FIG. 1). The purpose of this embodiment of the platform 19A is for those brake systems having dual master cylinder reservoirs. With this platform 19A, a pair of filler caps 10 can be attached to a pair of brake fluid containers and inserted into the respective holes 19B, 19C, and with this assembly applied to the dual reservoir brake system so as to fill both reservoirs at the same time to a predetermined level.

While the above description contains many specificities, these should not be construed as limitations on the scope of the invention, but rather as an exemplification of one preferred embodiment thereof. Other variations are possible.

Accordingly, the scope of the present invention should be determined not by the embodiments illustrated above, but by the appended claims and their legal equivalents.

What is claimed is:

1. A filler cap that attaches to a fluid container to facilitate control of the level to which a fluid is filled in a reservoir comprising
    a generally cylindrical base attachable to the fluid container,
    a cap top attached to said base,
    a face plate having at least one hole therethrough being in direct communication with the fluid in the fluid container,
    a generally cylindrical base extension longitudinally and co-axially extending between and attached to said cap top and said face plate, and
    a nozzle axially attached to said face plate, said nozzle having an open end cut on an angle a longitudinal axis of said nozzle.

2. The filler cap of claim 1, wherein said base, cap top, face plate, base extension, and nozzle are constructed out of single piece molded plastic.

3. The filler cap of claim 1, wherein said base further comprises
    internal threads to mate with a fluid container, and
    a plurality of external ribs distributed substantially equidistantly and longitudinally extending about the circumference of said base.

4. The filler cap of claim 1, wherein said face plate further comprises a plurality of holes therethrough being in direct communication with the fluid on the fluid container.

5. The filler cap of claim 1, wherein the distance between the cap top and face plate define the level to which fluid is to be filled in said reservoir relative to the top of the reservoir.

6. A filler cap that attaches to a fluid container to facilitate control of the level to which a fluid is filled in a reservoir comprising
    a generally cylindrical base attachable to the fluid container,
    a cap top attached to said base,
    a face plate having at least one hole therethrough being in direct communication with the fluid in the fluid container,
    a generally cylindrical base extension longitudinally and co-axially extending between and attached to said cap top and said face plate,
    a nozzle axially attached to said face plate, said nozzle having an open end cut on an angle along a longitudinal axis of said nozzle, and
    a platform adapted to receive the filler cap to facilitate positioning of the filler cap and fluid container assembly above the reservoir to be filled.

7. The filler cap of claim 6, wherein said platform further comprises at least one hole therethrough.

8. The filler cap of claim 1, further comprising a platform adapted to receive the filler cap to facilitate positioning of the filler cap and fluid container assembly above the reservoir to be filled.

9. The filler cap of claim 8, wherein said platform further comprises at least one hole therethrough.

10. An automatic fluid level control filler cap comprising a generally cylindrical base attachable to a fluid container, a generally circular cap top extending inwardly from one end of said base, a generally circular face plate having at least one hole therethrough being in direct fluid communication with the fluid in the fluid container, a generally cylindrical base extension longitudinally and coaxially extending between said cap top and said face plate, and a nozzle longitudinally and coaxially extending from said face plate, said nozzle having a first end open to the interior of the automatic fluid level control filler cap and a second end open to the exterior of the automatic fluid level control filler cap, said nozzle being cut on an angle along a longitudinal axis of said nozzle.

11. The automatic fluid level control filler cap of claim 10, wherein the angle cut of said nozzle is closely adjacent to said face plate.

12. The automatic fluid level control filler cap of claim 10, wherein said nozzle further comprises a short side and a long side created by the angle cut along the longitudinal axis of said nozzle, said short side being closely adjacent to said face plate.

* * * * *

UNITED STATES PATENT AND TRADEMARK OFFICE
CERTIFICATE OF CORRECTION

PATENT NO. : 5,431,204
DATED : July 11, 1995
INVENTOR(S) : Neward, Theodore C.

It is certified that error appears in the above-indentified patent and that said Letters Patent is hereby corrected as shown below:

Column 4, line 21, before "a" insert ---along---.

Column 4, line 34, delete "on" and insert --in-- therefor.

Signed and Sealed this

Seventh Day of November, 1995

Attest:

BRUCE LEHMAN

Attesting Officer

Commissioner of Patents and Trademarks